United States Patent [19]

Bourrat

[11] Patent Number: 4,907,756
[45] Date of Patent: Mar. 13, 1990

[54] WINDING BRAKE FOR SPRING-RETURN TAPE MEASURE

[75] Inventor: Andre Bourrat, Saint Etienne, France

[73] Assignee: Sam Outillage S.A., Saint Etienne, France

[21] Appl. No.: 342,837

[22] Filed: Apr. 25, 1989

[51] Int. Cl.$^4$ ............................................. B65H 75/48
[52] U.S. Cl. .................................................. 242/107.3
[58] Field of Search ............ 242/84.8, 107.3, 107.4 R, 242/107.4 B, 107.4 D, 191, 107.15, 107.6, 107

[56] References Cited

U.S. PATENT DOCUMENTS

| | | | |
|---|---|---|---|
| 2,896,912 | 7/1959 | Faugier et al. | 242/107.3 |
| 3,318,550 | 5/1967 | Quenot | 242/107.3 |
| 3,480,227 | 11/1969 | Matthews | 242/107.3 |
| 3,889,897 | 6/1975 | Van Zelderen | 242/107.3 |

Primary Examiner—Donald Watkins
Attorney, Agent, or Firm—Browdy and Neimark

[57] ABSTRACT

A winding brake for spring-return tape measures comprising a case having diametral walls, a drum disposed inside the case for carrying a graduated tape, said drum comprising a flange opposite one of the diametral wall of the case, at least one inside cradle integral with said drum, a housing formed between the one diametral wall of the case and the flange of the drum comprising a cylindrical friction face at least one approximately circular elastic tongue each having a first end integral with one of said at least one cradle, and a second end adapted to come into frictional contact with the cylindrical friction face of said housing, said first end being disposed downstream with respect to said second end during winding of the tape, at least one weight placed transversely in said housing and radially between the at least one cradle and the second end of the at least one tongue adapted to cooperate with the cylindrical friction face during rotation of the drum during winding and unwinding of the tape.

5 Claims, 1 Drawing Sheet 4,907,756

WINDING BRAKE FOR SPRING-RETURN TAPE MEASURE

BACKGROUND OF THE INVENTION

1. Field of the Invention

The present invention relates to a winding brake for a spring-return tape measure having weights working within a circular path during rotation in the case of drum carrying a graduated tape.

2. The Prior Art

Spring-return tape measures, more generally called tape measures, are generally made up of a drum which, carries the measuring tape and is mounted to rotate freely on a pin integral with a case. The drum is connected to this pin by a coil spring housed inside the case.

Unwinding of the graduated metal tape from the case winds the coil spring which, by elasticity, assures rewinding of the tape as soon as it is released.

This device is entirely satisfactory for tapes with a length of three meters or less but creates a problem for lengths beyond that. Actually, although the coil spring has a length less than that of the graduated tape, in the ratio of diameters, respectively of the drum and pin, its length increases with that of the graduated tape and leads, for graduated tapes of five meters, to a very high return force. Thus, during winding of a tape of great length, the winding coil of the tape assumes, under the recall effect of the coil spring, a rotation speed regularly increasing to become maximum and to reach, for example, a thousand revolutions per minute when the hook strikes the case. Because of this and the progressive increase of the winding diameter of the tape on the coil, the linear speed of the tape also increases. Even if the tape is perfectly aligned with the case before winding, in the last two meters of its winding, it tends to whip, which causes winding defects, damage and even breaking. Moreover, at the end of winding, the impact due to the stopping by the stop of the end hook against the case is very great since the case absorbs a kinetic energy taking into account the total weight of the coil, the diameter of the winding and the great rotation speed of the latter. This impact causes a deterioration of the case, the coil, the fasteners of the coil spring, the tape and the hook.

To eliminate this, it is already known to provide the spring-return tape measure with a brake limiting the rotation speed of the drum, which is made up of weights acting centrifugally. Such a device intervenes both during winding and unwinding, which is bothersome since unwinding should be able to be performed freely. Another drawback of this device is that it increases the weight of the spring-return tape measure, even though, for this type of product, which is carried in the pocket, lightness is important.

SUMMARY OF THE INVENTION

Therefore, object of the present invention is to provide a tape measure which overcomes the disadvantages of the prior art.

An object of the present invention is to provide a winding brake with weights which is not very heavy and which assures a much more effective braking during winding than during unwinding.

This brake is of the type comprising weights working with a circular plate during rotation in the case of the drum carrying the graduated tape.

According to the invention, these weights are placed transverse in a housing made between one of the diametral walls of the case and the flange opposite the drum. The housing comprises a cylindrical friction face. The weights are placed radially between, on the one hand, an inside cradle integral with the drum, and on the other hand, the free end of an outside elastic tongue which, approximately circular, is integral with the following cradle by its other end, the end placed downstream during winding, and is able to come in frictional contact with the cylindrical friction face of the housing.

Thus, during rotation of the drum, each weight tends, under the action of centrifugal force, to apply the free end of the corresponding tongue against the cylindrical friction face of the case. As a function of the upstream or downstream position of these contact areas relative to the point of connection of the tongue with the cradle and drum, a position depending on the direction of rotation, the tongue is either pulled or pushed. When it is pulled, i.e., during unwinding of the graduated tape, the reaction forces due to its friction against the case tend to separate it from the case and consequently to reduce the friction surface and the resistant force coming from its friction. Conversely, when this tongue is pushed, i.e., during winding, the reaction forces due to friction on the case tend to flatten this tongue further on the case, thus increasing the friction surfaces in contact and consequently the application and braking force. This simple, light and inexpensive device thus assures a more effective braking during winding.

BRIEF DESCRIPTION OF THE DRAWINGS

Other characteristics and advantages will come out from the following description with reference to the accompanying diagrammatic drawings representing a tape measure provided with an embodiment of the braking device according to the invention, in which.

DETAILED DESCRIPTION OF THE PREFERRED EMBODIMENT

Figure 1:
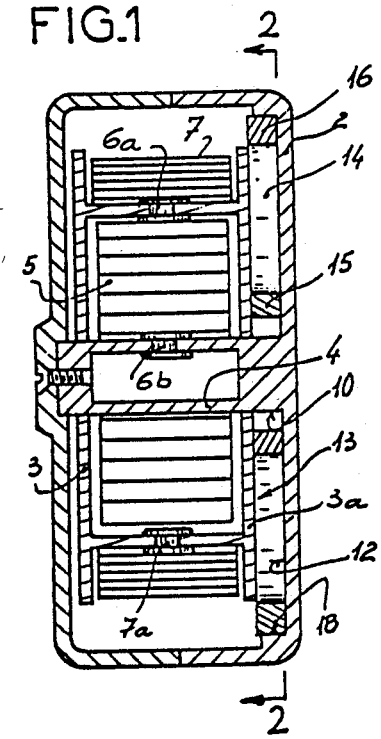
FIG. 1 is a view in cross section of the tape measure.

In a known way, the tape measure is made up of a case 2 which, in this embodiment, is in two parts. A drum 3 is mounted to rotate freely on a central pin 4 of the case 2, a coil spring 5 has one end 6a connected to drum 3 and another end 6b connected to pin 4 and, finally, a measuring tape 7 whose one end is hooked at 7a to drum 4. Of course, the case 2 comprises an opening for passage of the other end of tape 7.

According to the invention, the tape measure is provided with a winding brake placed in a housing 10 made between diametral wall 12 of case 2 and face 13 of flange 3a of drum 3. This device consists of two Weights 14 placed in cradles 15 integral with said flange 3a. Each of the weights consists of a generally cylindrical metal disk. The two cradles 15 are diametrically opposite on both sides of pin 4 and are placed back to back with their concavity turned outward. The braking device also comprises two elastic tongues 16 having one end 16a which is free and comes ahead of the following weight and other end 16b connected to flange 3a of the drum. In this embodiment, the end 16b is integral with corresponding cradle 15. These tongues are placed so that their ends 16b, connected to the drum, are upstream relative to their end 16a when the drum is driven in the unwinding direction represented by arrow 17 in FIG. 2 and downstream of ends 16a when winding. Tongues 16, semicircular in shape, are placed opposite a cylindrical friction face 18 made on the periphery of housing 10 of the case.

Tongues 16 and cradles 14 can be made independent of the drum and can be attached to it by hooks, clipping or any other means, but can also be made at the same time as the drum. Under these conditions and to facilitate the molding operation, tongues 16 have an inside diameter greater than the outside diameter of drum 3.

With this device, during unwinding of the tape measure, tongues 16 are drawn by drum 3, i.e., at their free ends 16a which are oval relative to the direction of rotation. During rotation of drum 3, weights 14 are subjected to an outward radial centrifugal force which, as shown by arrows FC, tend to flatten them against free end 16a of tongues 16 and, consequently, which tends to flatten these tongues against friction face 18. Simultaneously, the case exerts on end 16a of the tongue, on the one hand, a radial reaction force FR opposing the centrifugal force and, on the other hand, a tangential force FT opposing the advance of the corresponding tongue. These forces FR and FT form a component FK which is inclined upstream and therefore tends to draw end 16a of each tongue and to separate its curved central part from friction face 18.

Figure 2:
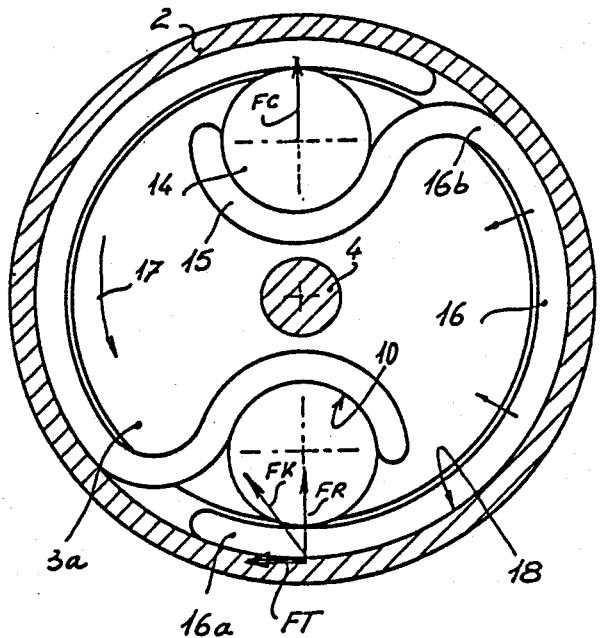
FIGS. 2 and 3 are views in section along II—II of FIG. 1 illustrating the functioning of the brake, respectively, in unwinding face and in the winding face.
Figure 3:
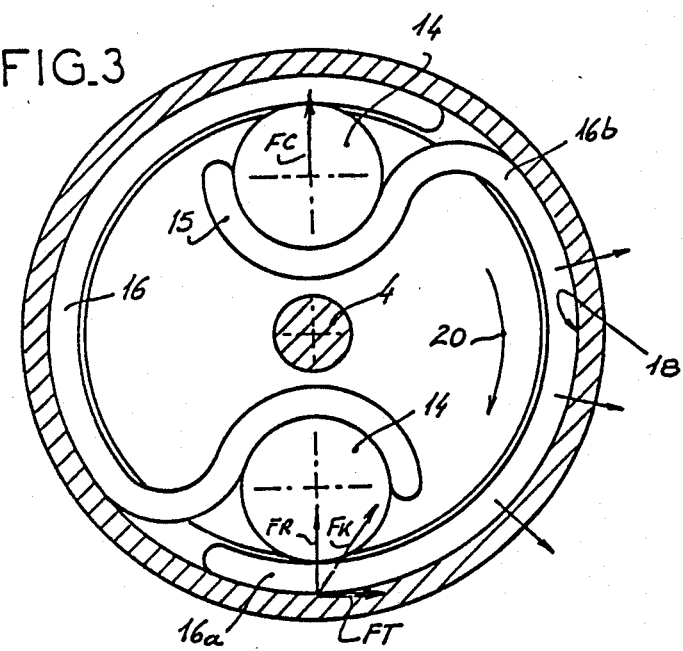

Conversely, during rotation of drum 3 in the winding direction, represented by arrow 20 in FIG. 3, component FK of the reaction forces, always being exerted in the direction of the upstream part of the tongue but in the opposite direction relative to FIG. 2, tends to push the tongue and to flatten its central part against friction face 18, which has the effect of increasing the surfaces in contact and, by the resulting friction, to increase the braking forces. In other words, if during unwinding, the braking device provides minimal resistant opposite torque, during winding, it provides a much greater opposite force, assuring the desired effects. It should be noted that this simple device is not very bulky, is very light and, by the simplicity of its components, is not very costly.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

I claim:

1. A winding brake for spring-return tape measures comprising:
   a case having diametral walls;
   a drum disposed inside the case for carrying a graduated tape, said drum comprising a flange opposite one of the diametral wall of the case;
   at least one inside cradle integral with said drum;
   a housing formed between the one diametral wall of the case and the flange of the drum comprising a cylindrical friction face;
   at least one approximately circular elastic tongue each having a first end integral with one of said at least one cradle, and a second end adapted to come into frictional contact with the cylindrical friction face of said housing, said first end being disposed downstream with respect to said second end during winding of the tape; and
   at least one weight placed transversely in said housing and radially between the at least one cradle and the second end of the at least one tongue adapted to cooperate with the cylindrical friction face during rotation of the drum during winding and unwinding of the tape.

2. The winding brake according to claim 1, wherein the at least one weight is disk-shaped and is placed in the at least one cradle which are semicircular in shape.

3. The winding brake according to claim 1, wherein the at inside diameter of the at least one tongue is greater than the outside diameter of the flange of the drum.

4. The winding brake according to the set of claim 1, wherein the at least one cradle and the at least one tongue are integral with the drum with which they molded as one piece.

5. The winding brake according to claim 1, wherein the at least one cradle is provided with hooks ratching in a diametral wall of the drum.

* * * * *